Sept. 16, 1930.　　　G. T. BALFE　　　1,776,140
GASKET
Filed Jan. 13, 1930
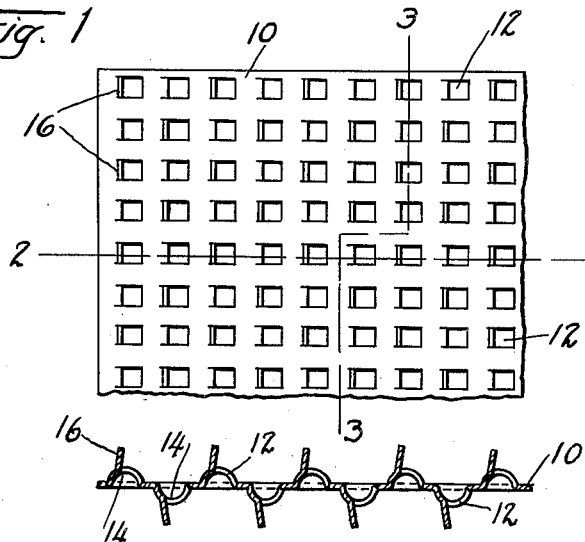
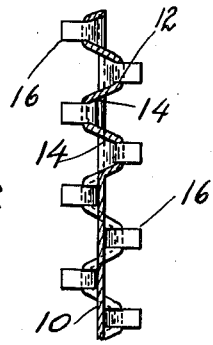
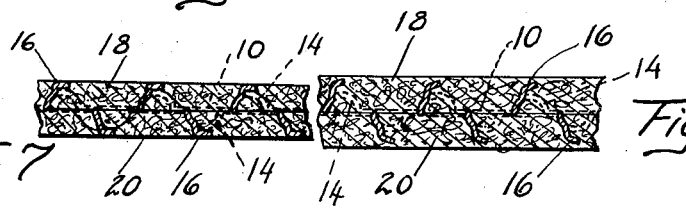
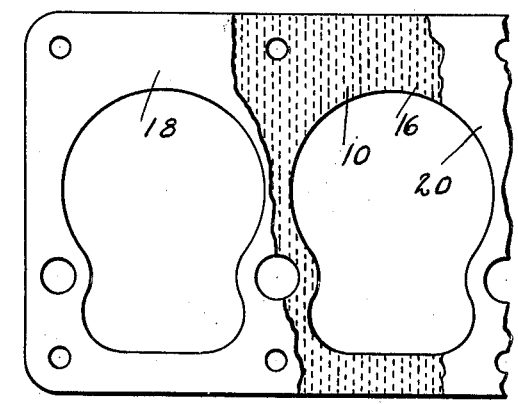
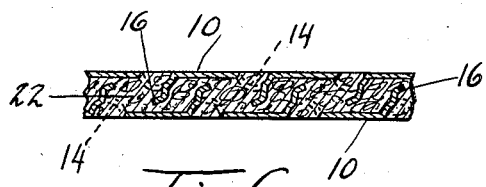
INVENTOR.
George T. Balfe
BY Parker & Burton
ATTORNEYS Patented Sept. 16, 1930

1,776,140

UNITED STATES PATENT OFFICE

GEORGE T. BALFE, OF DETROIT, MICHIGAN, ASSIGNOR TO DETROIT GASKET & MFG. CO., OF DETROIT, MICHIGAN, A CORPORATION OF MICHIGAN

GASKET

Application filed January 13, 1930. Serial No. 420,331.

My invention relates to gaskets and has particular reference to a type of gasket primarily designed for use where high pressures must be withstood and a tight seal maintained.

The present application represents a modification of the construction disclosed in my copending application, Serial No. 402,589, filed Oct. 26, 1929, and no claim is made in the present case to the broad structure covered by said earlier filed copending case.

An object of my invention is to greatly increase the efficiency, lengthen the use and the life, and in general improve a gasket structure somewhat similar to that described and claimed in my copending application Serial Number 402,589, filed October 26, 1929.

More specifically the object of my invention is to so construct and shape a reinforcing element which is embedded in any suitable gasket material that it will form a more binding union between the two and will form a barrier tending to resist breakage or blowouts through the gasket material. As is well known, there is a tendency for gaskets, particularly when they are subjected to high temperatures and pressures at the same time, to burn, break, or tear at some points. Such burning or tearing heretofore has marked the end of the useful functions of the gasket because the union, or cohesion of the gasket as a unit has been insufficient to prevent the spreading of this tear.

Through the use of a reinforcing plate having protruding tongue portions minutely spaced apart on each side thereof, which are embedded in suitable compressible gasket material, a large series of barriers is erected to withstand any tendency of an initial burn or tear to spread further through the gasket. Also, by greatly increasing the cohesion between my reinforcing element and the gasket material I have assisted in minimizing the tendency to break and preventing the spreading thereof should it occur.

This tendency of an initial break or tear to spread through the gasket applies particularly to gaskets used in combustion engines, where the various points which are subject to heat and pressure are located in close proximity to one another.

Still other objects and meritorious features of my invention will become apparent from the following description taken in conjunction with the drawings wherein like numerals refer to like parts throughout the several figures and wherein:

Fig. 1 is a plan view of my reinforcing element,

Fig. 2 is a section taken on the line 2—2 of Fig. 1,

Fig. 3 is a section taken on the line 3—3 of Fig. 1,

Fig. 4 is a section through my coupled gasket, illustrating the manner in which my reinforcing element is embedded between layers and gasket material, Fig. 5 is a plan view, partly broken away, of a gasket used in the cylinder head of a combustion engine, Fig. 6 is a somewhat modified arrangement of my gasket structure, and Fig. 7 illustrates another modified assembly.

My reinforcing element comprises a thin sheet of reinforcing material 10, preferably of sheet steel. My reinforcing sheet is provided with horizontal and vertical rows of apertures 12. These apertures may be spaced equally from each other both horizontally and vertically, and are formed with a punch machine which need not be described herein, but fashions the punch apertures in a manner hereafter to be described.

These apertures are closely compacted and punches enter the sheet 10 from opposite directions to form alternating apertures extending in opposite directions. The result of this alternate punching is clearly illustrated in Figs. 2 and 3 where alternate apertures are shown extending in opposite directions. In the directions in which the punch enters a crater like depression 14 or cup is formed. This cup forms an oppositely directed protuberance. This protuberance includes a small tongue 16 extending away laterally from the plane of the reinforcing element 10. The spacing between each of the apertures or cup like depressions or protuberances in my element 10 is somewhat exaggerated in the drawings for the purpose of more clearly illustrating the precise structure resulting from the punch but they are closely compacted and preferably arranged in staggered rows. The portion marked 14, constituting the crater like protuberance or cup shaped depression is minute, but necessarily results in the initial contact of my punch with the sheet material of the reinforcing element. The tang 16 is also relatively small but projects beyond the protuberance 14.

This reinforcing element is shown in Figs. 4 and 5 as embedded between two layers 18 and 20 of suitable gasket material, which may be felt, asbestos, or any desired packing substance. This embedding operation is accomplished by compressing the two layers 18 and 20 toward one another after having inserted the reinforcing element 10 therebetween.

The tongue 16 is of a deformable nature, and when subjected to pressure will deform in the manner indicated in Fig. 4 to constitute a clamp or hook. In this way the protuberances 14, as well as the deformed tongue extensions 16 will function to form a more cohesive binding, gasket unit than has hitherto been available.

A feature of importance is that the packing material is forced into the crater like apertures, one layer on one side of the perforated metal sheet and the other layer on the other side thereof and thereby forms a much more perfect joint. The protuberances which form the craters or apertures are staggered and together with the tongues form barriers in the packing layers which obstruct the blowing through of the packing material.

The uniform thickness of my gasket structure eliminates the necessity of excess pressure around the openings thereof, which the double thickness around the edges of the customary copper gasket requires for the purpose of sealing the joint properly.

While the tongue portions here shown do not extend entirely through the packing layers, they might readily do so and be clinched down to embed therein, as indicated in Fig. 7. Such structure only necessitates utilizing somewhat narrower layers of packing material or increasing the length of tongues 16.

Furthermore it is obvious that if a very stiff reinforcing sheet material is used there need be no deformation, or clinching over of the upper portions of tongue 16 when the layers of gasket material are compressed thereon. The tongues 16 will then retain the position illustrated in Fig. 2 when embedded.

In Fig. 6 I have illustrated a possible modification of my gasket assembly, wherein a single layer 22 of packing material only is utilized and a reinforcing element 10 embedded therein on opposite sides thereof.

Due to the fact that the outer surfaces of my gasket are composed of packing material and compressible, it may be utilized to seal joints between somewhat roughened or uneven elements. Accordingly I contemplate its use between surfaces which are uneven, warped, or which have not been machined.

While I have illustrated a preferred embodiment of my invention, various other modifications will be apparent to those skilled in the art and for that reason I intend to limit myself only within the scope of the appended claims.

I claim:

1. A gasket insert comprising a plate member having on each side thereof a multiplicity of protuberances, portions of said protuberances of substantially less area than the protuberances being cut away and angularly deflected from the protuberance walls beyond the apex thereof to form tangs, said protuberances forming on the other side of said plate member cavities the walls of which are defined by the uncut portions of said protuberance walls.

2. A gasket insert comprising a plate member having depressed portions forming protuberances on one side thereof, portions of said protuberances of substantially less area than the protuberances being cut away and angularly deflected from the protuberance walls beyond the apex thereof to form tangs, said protuberances forming on the other side of said member cavities the walls of which are defined by the uncut portions of said protuberance walls.

3. A gasket comprising a layer of gasket forming material and a layer of reinforcing material co-extensive therewith, said reinforcing layer having closely associated laterally projecting protuberances and cavities one one side thereof, said protuberances each having struck from the wall thereof a tang of less area than the protuberances and extending away from the sheet beyond the apex of the protuberance, said tangs and protuberances being embedded in said gasket material layer and said gasket material layer being retained in said cavities when the layers are united.

4. A gasket comprising two layers of suitable gasket forming material and a layer of reinforcing sheet metal arranged therebetween, said reinforcing metal sheet provided with laterally directed closely compacted cup-shaped depressions on both sides, the cup-shaped depressions on each side forming protuberances on the opposite sides and each having a tongue punched from its bottom and extending beyond its apex, each layer of gasket forming material having embedded therein one set of protuberances and the tongues punched therefrom and being itself embedded in the cup like depressions of the other set of protuberances.

5. A gasket comprising layers of gasket forming material and a layer of reinforcing material co-extensive therewith, said reinforcing layer having closely associated laterally projecting protuberances on opposite sides each forming laterally disposed cavities on opposite sides, said protuberances having struck from the walls thereof tangs of less area than the protuberances and extending away from the sheet beyond the plane of the remaining walls of the protuberances, said tangs and protuberances being embedded in said gasket material layers and said gasket material layers being retained in said cavities when the layers are united, said tangs extending a substantial distance into the layers of gasket forming material and deformed by the pressure required to unite the layers, to thereby reinforce the layers of gasket material substantially throughout its thickness.

6. A gasket comprising layers of gasket forming material and a layer of reinforcing material coextensive therewith, said reinforcing layer having closely associated laterally projecting protuberances on opposite sides each forming laterally disposed cavities on opposite sides, said protuberances having struck from the walls thereof tangs of less area than the protuberances and extending away from the sheet of reinforcing material beyond the plane of the remaining walls of the protuberances, said tangs and protuberances being embedded in said gasket material layers and said gasket material layers being retained in said cavities when the layers are united, said tangs being of a length to extend through said layers of gasket material and having their ends deformed by the pressure required to unite the layers, to thereby reinforce the layers of gasket material substantially throughout its thickness, said deformed tangs clenching the gasket material.

In testimony whereof, I, GEORGE T. BALFE, sign this specification.

GEORGE T. BALFE.